United States Patent
Oh et al.

(10) Patent No.: US 12,457,109 B2
(45) Date of Patent: Oct. 28, 2025

(54) MEMBERSHIP PROOF DEVICE AND METHOD FOR ENSURING PRIVACY

(71) Applicants: IUCF-HYU (INDUSTRY-UNIVERSITY COOPERATION FOUNDATION HANYANG UNIVERSITY), Seoul (KR); KOOKMIN UNIVERSITY INDUSTRYACADEMY COOPERATION FOUNDATION, Seoul (KR)

(72) Inventors: Hyun Ok Oh, Seoul (KR); Se Min Han, Seoul (KR); Ji Hye Kim, Seoul (KR)

(73) Assignees: IUCF-HYU (INDUSTRY-UNIVERSITY COOPERATION FOUNDATION HANYANG UNIVERSITY), Seoul (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 58 days.

(21) Appl. No.: 18/533,973

(22) Filed: Dec. 8, 2023

(65) Prior Publication Data
US 2024/0205010 A1 Jun. 20, 2024

(30) Foreign Application Priority Data
Dec. 19, 2022 (KR) .......................... 10-2022-0178009

(51) Int. Cl.
*H04L 9/30* (2006.01)
*H04L 9/32* (2006.01)

(52) U.S. Cl.
CPC .......... *H04L 9/3218* (2013.01); *H04L 9/3033* (2013.01); *H04L 9/3221* (2013.01);
(Continued)

(58) Field of Classification Search
CPC ... H04L 9/3218; H04L 9/3033; H04L 9/3249; H04L 9/3271; H04L 9/3221; H04L 9/302
(Continued)

(56) References Cited

U.S. PATENT DOCUMENTS

| | | | |
|---|---|---|---|
| 11,550,952 B1 * | 1/2023 | Zhang | G06F 21/6245 |
| 2010/0115281 A1 * | 5/2010 | Camenisch | H04L 9/302 |
| | | | 713/168 |

(Continued)

FOREIGN PATENT DOCUMENTS

| | | |
|---|---|---|
| JP | 4851497 B2 | 10/2011 |
| KR | 10-2012-0072014 A | 7/2012 |

(Continued)

OTHER PUBLICATIONS

Merkle, Ralph C. A digital signature based on a conventional encryption function. Conference on the theory and application of cryptographic techniques. Santa Barbara, Aug. 16-20, 1987, 369-378. (https://www.scirp.org/reference/referencespapers?referenceid=3264828).

(Continued)

*Primary Examiner* — Thanh T Le

(57) ABSTRACT

Disclosed are a membership proof device and method for ensuring privacy. The disclosed membership proof method includes for ensuring privacy includes performing a first calculation for a user's membership proof using a zero-knowledge proof algorithm and performing a second calculation for the user's membership proof on a user value of the user using a Rivest-Shamir-Adleman (RSA) accumulator- (Continued)

based membership proof algorithm and transmitting results of the first and second calculations to a verifier.

8 Claims, 7 Drawing Sheets

(52) U.S. Cl.
CPC .......... *H04L 9/3249* (2013.01); *H04L 9/3271* (2013.01); *H04L 9/302* (2013.01)

(58) Field of Classification Search
USPC .......................................................... 713/155
See application file for complete search history.

(56) References Cited

U.S. PATENT DOCUMENTS

| | | | | |
|---|---|---|---|---|
| 2011/0225429 | A1* | 9/2011 | Papamanthou | G06F 16/2246 713/189 |
| 2012/0005098 | A1* | 1/2012 | Gross | G06F 21/31 705/50 |
| 2019/0165948 | A1* | 5/2019 | Sako | G06Q 50/40 |
| 2020/0145192 | A1* | 5/2020 | Elkhiyaoui | H04L 9/0869 |
| 2022/0021537 | A1* | 1/2022 | Wagner | H04L 9/3218 |
| 2022/0321354 | A1* | 10/2022 | Ladd | H04L 9/3252 |
| 2023/0267220 | A1* | 8/2023 | El Khiyaoui | H04L 9/3252 726/26 |
| 2023/0267457 | A1* | 8/2023 | El Khiyaoui | G06Q 20/4014 705/64 |
| 2023/0308279 | A1* | 9/2023 | Yamaoka | H04L 9/3218 |

FOREIGN PATENT DOCUMENTS

| | | |
|---|---|---|
| KR | 10-1754796 B1 | 7/2017 |
| KR | 10-2333322 B1 | 11/2021 |
| KR | 10-2022-0122940 A | 9/2022 |

OTHER PUBLICATIONS

Benarroch, Daniel, et al. Zero-knowledge proofs for set membership: efficient, succinct, modular. Financial Cryptography and Data Security: 25th International Conference, FC 2021, Virtual Event, Mar. 1-5, 2021, Revised Selected Papers, Part I, pp. 393-414. (https://dl.acm.org/doi/abs/10.1007/978-3-662-64322-8_19).

Boneh, Dan, Benedikt B nz, and Ben Fisch. Batching techniques for accumulators with applications to iops and stateless blockchains. Advances in Cryptology—CRYPTO 2019: 39th Annual International Cryptology Conference, Santa Barbara, CA, USA, Aug. 18-22, 2019, Proceedings, Part I, pp. 561-586. (https://dl.acm.org/doi/10.1007/978-3-030-26948-7_20.

Ozdemir, Alex, et al. Scaling verifiable computation using efficient set accumulators. SEC'20: Proceedings of the 29th USENIX Conference on Security Symposium, Aug. 2020, Article No. 117, pp. 2075-2092.

Matteo Campanelli, Dario Fiore, Semin Han, Jihye Kim, Dimitris Kolonelos, and Hyunok Oh. Succinct Zero-Knowledge. Batch Proofs for Set Accumulators, Cryptology ePrint Archive, Paper 2021/1672, Dec. 21, 2021.

Daniel Benarroch et al. "Zero-Knowledge Proofs for Set Membership: Efficient, Succinct, Modular". QEDIT, Israel, IMDEA Software Institute, Madrid, Spain, Feb. 26, 2021.

Ronald Cramer, "Modular Design of Secure yet Practical Cryptographic Protocols". Doctoral thesis, University of Amsterdam, Jan. 31, 1997.

* cited by examiner ated on Dec. 21, 2021.

MEMBERSHIP PROOF DEVICE AND METHOD FOR ENSURING PRIVACY

CROSS-REFERENCE TO RELATED APPLICATION

This application claims priority to and the benefit of Korean Patent Application No. 2022-0178009, filed on Dec. 19, 2022, the disclosure of which is incorporated herein by reference in its entirety.

BACKGROUND

1. Field of the Invention

The present disclosure relates to a membership proof device and method for ensuring privacy, and more specifically, to a device and method for rapidly proving a user's membership while ensuring his or her privacy.

2. Discussion of Related Art

Membership proof is a process of proving whether a user's user value is included in a specific set. Here, the user value may be a social number, an identifier (ID), a phone number, or the like for identifying the user.

For example, membership proof may be used for a cryptocurrency transaction occurring in a blockchain network and to verify whether the amount of money to be sent by a remitter is the remitter's money.

To prove a user's membership while ensuring his or her privacy, a zero-knowledge proof algorithm, such as zero-knowledge Succinct Non-interactive Arguments of Knowledge (zk-SNARK), may be taken into consideration. Membership proof employing a zero-knowledge proof algorithm may be performed using a Merkle tree or a Rivest-Shamir-Adleman (RSA) accumulator in a zero-knowledge proof algorithm. Membership proof employing an RSA accumulator involves generating a membership proof value by exponentiating one of values included in an RSA group by a user value. For example, when there are first to tenth user values for first to tenth users and membership proof is performed on the first user, one value included in an RSA group is exponentiated by all the user values excluding the first user value to generate a membership proof value. A verifier may exponentiate the membership proof value by the first user value received from a prover and determine whether the first user is included in a specific set using the calculation result.

In this membership proof method, a hash operation is performed when a Merkle tree is used, and an exponentiation operation is performed when an RSA accumulator is used. Accordingly, the load of membership proof increases, and a time required for the membership proof increases.

STATEMENT REGARDING PRIOR DISCLOSURES BY THE INVENTOR OR A JOINT INVENTOR

At least one inventor or joint inventor of the present disclosure has made related disclosures in Cryptology ePrint Archive, Paper 2021/1672 on Dec. 21, 2021.

SUMMARY OF THE DISCLOSURE

The present disclosure is directed to providing a device and method for rapidly proving a user's membership while ensuring his or her privacy.

According to an aspect of the present disclosure, there is provided a membership proof method for ensuring privacy including performing a first calculation for a user's membership proof using a zero-knowledge proof algorithm and performing a second calculation for the user's membership proof on a user value of the user using a Rivest-Shamir-Adleman (RSA) accumulator-based membership proof algorithm and transmitting results of the first and second calculations to a verifier.

According to another aspect of the present disclosure, there is provided a membership proof method for ensuring privacy including generating an RSA accumulator-based membership proof value through an exponentiation operation on a user value of a user, generating a conversion value of the user value using a challenge value of a verifier and a random value, and transmitting the membership proof value and the conversion value to the verifier.

According to another aspect of the present disclosure, there is provided a membership proof device for ensuring privacy including a memory, at least one processor electrically connected to the memory, and a communicator. The processor performs a first calculation for a user's membership proof using a zero-knowledge proof algorithm and performs a second calculation for the user's membership proof on a user value of the user using an RSA accumulator-based membership proof algorithm, and the communicator transmits results of the first and second calculations to a verifier.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
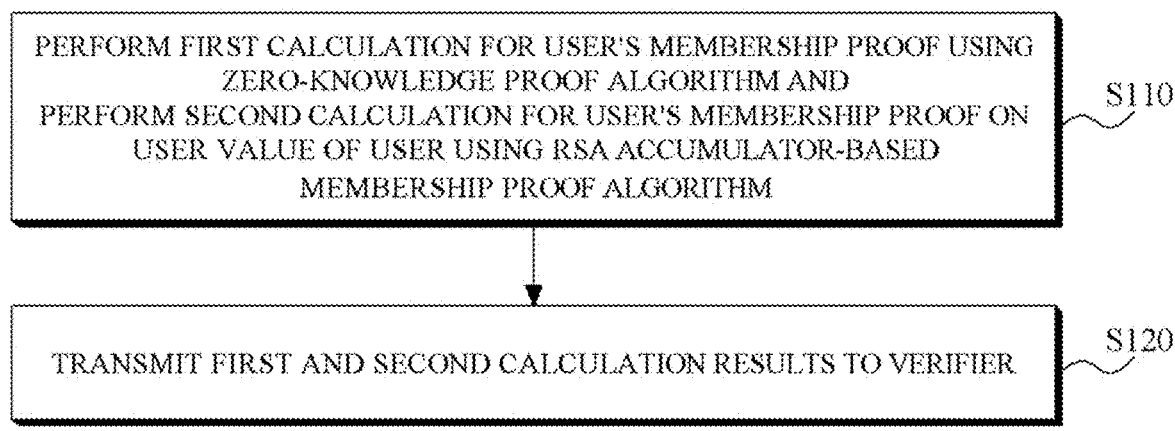
FIG. 1 is a flowchart illustrating a membership proof method for ensuring privacy according to an exemplary embodiment of the present disclosure.

Since the present disclosure can be variously modified and have several embodiments, specific embodiments will be illustrated in the drawings and described in detail below. However, the embodiments are not intended to limit the present disclosure to specific forms of implementation, and it should be understood that the present disclosure includes all modifications, equivalents, and substitutions within the spirit and technical scope of the present disclosure. Throughout the drawings, like reference numerals refer to like components.

As described above, when a Rivest-Shamir-Adleman (RSA) accumulator-based membership proof is performed in a zero-knowledge proof algorithm, a time required for membership proof may increase due to the load of an exponentiation operation.

According to the present disclosure, to rapidly perform membership proof, an exponentiation operation for RSA accumulator-based membership proof is performed out of a zero-knowledge proof algorithm. In other words, according to the present disclosure, an exponentiation operation for membership proof is performed through an exponentiation algorithm which is separate from a zero-knowledge proof algorithm.

In this case, it is necessary to verify whether a user value used in the zero-knowledge proof algorithm is equal to a user value used in the exponentiation algorithm. According to an exemplary embodiment of the present disclosure, to verify this, a commit-and-prove technique is used.

Also, according to an exemplary embodiment of the present disclosure, a proof value for membership proof is exponentiated by a randomly selected prime number to efficiently ensure a user's privacy.

A membership proof method according to an exemplary embodiment of the present disclosure may be used in a blockchain-based transaction. To verify whether the amount of money sent by a remitter is the remitter's, a membership proof method according to an exemplary embodiment of the present disclosure may be used, and to verify the validity of a transaction, a zero-knowledge proof algorithm may be used together.

A membership proof method according to an exemplary embodiment of the present disclosure may be performed by a computing device including a memory and a processor.

Hereinafter, exemplary embodiments of the present disclosure will be described in detail with reference to the accompanying drawings.

FIG. 1 is a flowchart illustrating a membership proof method for ensuring privacy according to an exemplary embodiment of the present disclosure.

Referring to FIG. 1, a computing device according to the exemplary embodiment of the present disclosure performs a first calculation for a user's membership proof using a zero-knowledge proof algorithm. Also, the computing device performs a second calculation for the user's membership proof on a user value of the user using an RSA accumulator-based membership proof algorithm (S110). Among calculations required for the RSA accumulator-based membership proof algorithm, the second calculation for generating a membership proof value through an exponentiation operation on the user value is performed by the RSA accumulator-based membership proof algorithm, and the first calculation, such as addition or multiplication, required for RSA accumulator-based membership proof is performed by the zero-knowledge proof algorithm. In other words, the RSA accumulator-based membership proof algorithm is an algorithm that performs an exponentiation operation required for generating a membership proof value.

Expression 1 is an expression of the second calculation for generating an RSA accumulator-based membership proof value.

$$W \leftarrow g^{\prod_{u_i \in S \setminus \{u_1,\ldots,u_m\}} u_i} \qquad \text{[Expression 1]}$$

Here, W is a membership proof value, g is a generator, one value included in an RSA group, u is a user value, i represents indices assigned to user values of different users, m is the number of user values, and S is a set for determining whether a user value is included therein.

The computing device transmits first and second calculation results to a verifier (S120), and the verifier determines whether the user value of the user is included in the set of Expression 1 using the first and second calculation results. The verifier may be a computing device for processing the first and second calculation results.

In this way, when an RSA accumulator-based exponentiation operation is performed in a separate algorithm from the zero-knowledge proof algorithm, the exponentiation operation with a heavy load is processed out of the zero-knowledge proof algorithm, and thus a time required for membership proof can be reduced.

Meanwhile, a membership proof method for effectively ensuring a user's privacy will be described below according to an additional embodiment.

Figure 2:
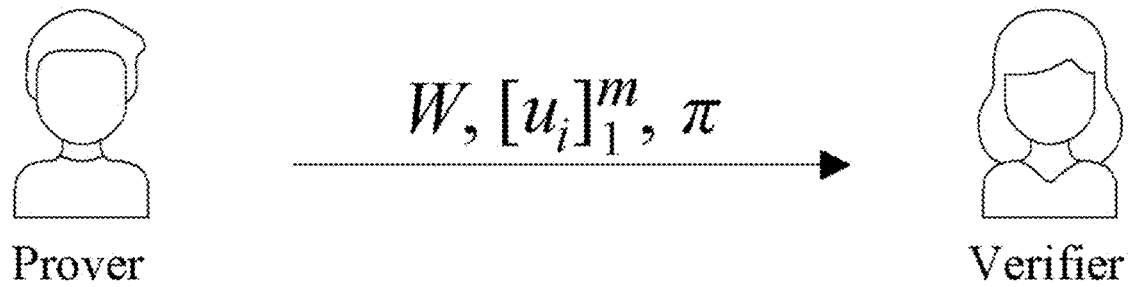
FIGS. 2 to 4 are diagrams illustrating a membership proof method for ensuring privacy according to another exemplary embodiment of the present disclosure.
Figure 3:
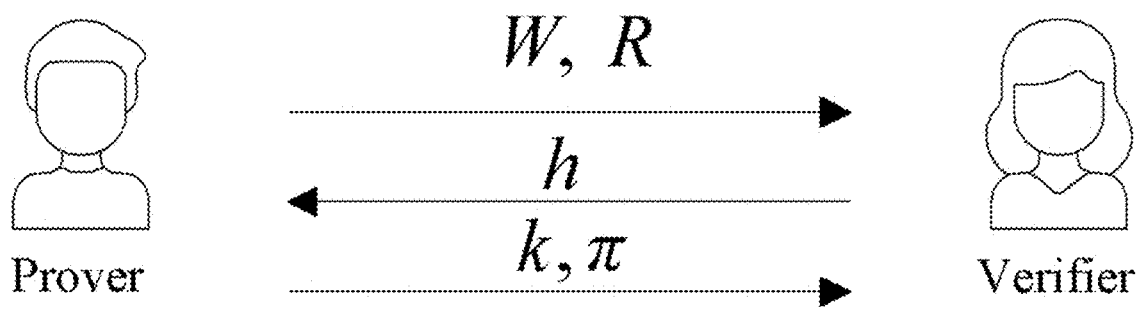
Figure 4:
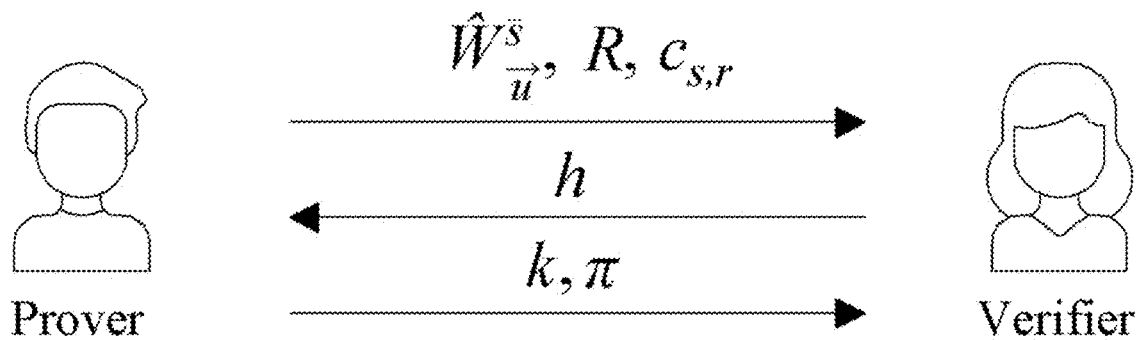
Figure 5:
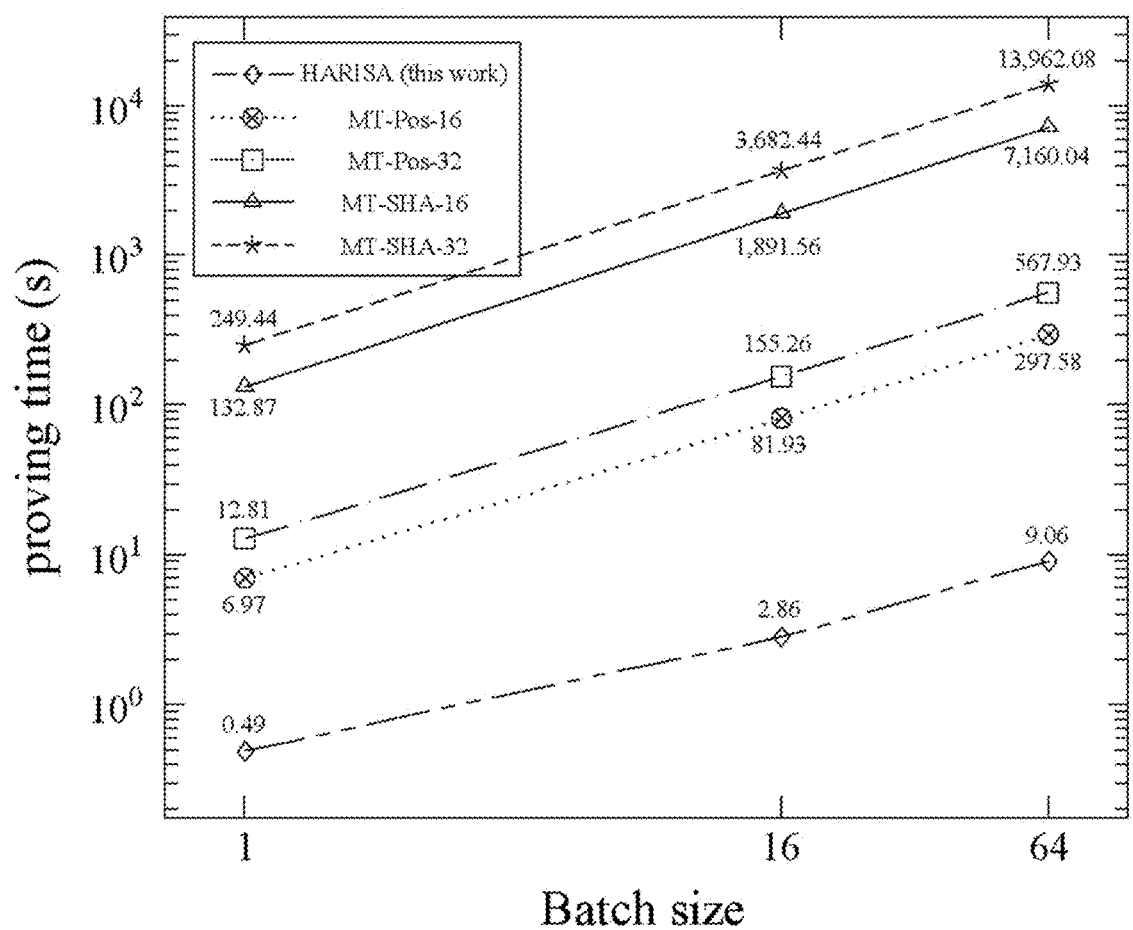
FIG. 5 is a graph illustrating a membership proving time of the membership proof method according to an exemplary embodiment of the present disclosure.

FIGS. 2 to 4 are diagrams illustrating a membership proof method for ensuring privacy according to another exemplary embodiment of the present disclosure, and FIG. 5 is a graph illustrating a membership proving time of the membership proof method according to an exemplary embodiment of the present disclosure.

FIGS. 2 to 4 illustrate a membership proof method in a blockchain-based transaction process according to an exemplary embodiment. In FIGS. 2 to 4, a prover corresponds to the computing device of FIG. 1.

Referring to FIG. 2, as described above, the prover transmits a membership proof value W, which is a second calculation result of an RSA accumulator-based membership proof algorithm, to a verifier together with a user value. Also, the prover transmits a zero-knowledge proof value $\pi$ for verifying the validity of a transaction to the verifier. The zero-knowledge proof value may be generated through a zero-knowledge proof algorithm.

In the case of FIG. 2, the user value is transmitted to the verifier. Accordingly, to effectively ensure a user's privacy, the prover may generate a conversion value k for the user value using a challenge value h of the verifier and a random value R as shown in FIG. 3. The conversion value corresponds to a first calculation result. Then, the prover may transmit the conversion value and the random value used for generating the conversion value to the verifier. The conversion value may be generated as shown in Expression 2 according to a sigma protocol.

$$k \leftarrow r + h \cdot \prod_{i \in [m]} u_i \qquad \text{[Expression 2]}$$

Here, r corresponds to the foregoing random value.

Although the user value is not directly transmitted to the verifier due to the conversion value, it is not determined whether the user value is a value used in common for the conversion value and the membership proof value. In other words, the conversion value and the membership proof value are generated through different algorithms, and thus it is necessary for the verifier to determine whether the same user value is used for the conversion value and the membership proof value generated through different algorithms.

To this end, as shown in FIG. 4, the prover may generate a commitment value for each of the user value and the random value and transmit the commitment values to the verifier. The commitment values are hash values for the user value and the random value and correspond to the first calculation result.

The verifier may verify that the user value is used in common for the conversion value and the membership proof value using the conversion value and the commitment values as shown in Expression 3. When Expression 3 is satisfied, the user value may be determined as a value used in common for the conversion value and the membership proof value.

$$g^k = g^r(g^u)^h \qquad \text{[Expression 3]}$$

Here, $g^r$ is the commitment value for the random value, and $g^u$ is the commitment value for the user value.

To avoid exposing the user value used for generating the membership proof value, that is, to give a zero-knowledge characteristic to the membership proof value, the prover may additionally exponentiate the membership proof value W by at least one prime number $\overline{s}$ selected from a preset random prime number set and transmit the membership proof value $\hat{W}_{\vec{u};\vec{s}}$ additionally exponentiated by the prime number to the verifier in addition to the user value.

When the membership proof value is additionally exponentiated by the prime number, the prover may also reflect the prime number on the conversion value and additionally generate a commitment value. As shown in Expression 4, the prover may generate a conversion value by additionally using a prime number of the random prime number set other than the prime number selected from the random prime number set.

$$k \leftarrow r + s \cdot h \cdot \prod_{i \in [m]} u_i \qquad \text{[Expression 4]}$$

Here, s is the prime number of the random prime number set other than the prime number selected from the random prime number set.

Then, the prover additionally generates a commitment value for the other prime number. The prover transmits the user value, commitment values $C_{s,r}$ for the random value and the other prime number, and the conversion value generated according to Expression 4 to the verifier together with the updated membership proof value $\hat{W}_{\vec{u};\vec{s}}$.

In addition, to reduce the membership proof value which increases in proportion to the number of memberships to be proved, the prover may convert the membership proof value into a constant which is not proportional to the number of memberships using a fast proof of knowledge exponent (PoKE) technique.

As shown in FIG. 5, an exemplary embodiment (HARiSA) of the present disclosure significantly reduces a membership proving time compared to Merkle tree (MT)-based membership proof methods. In FIG. 5, a batch size represents the number of memberships.

Figure 6:
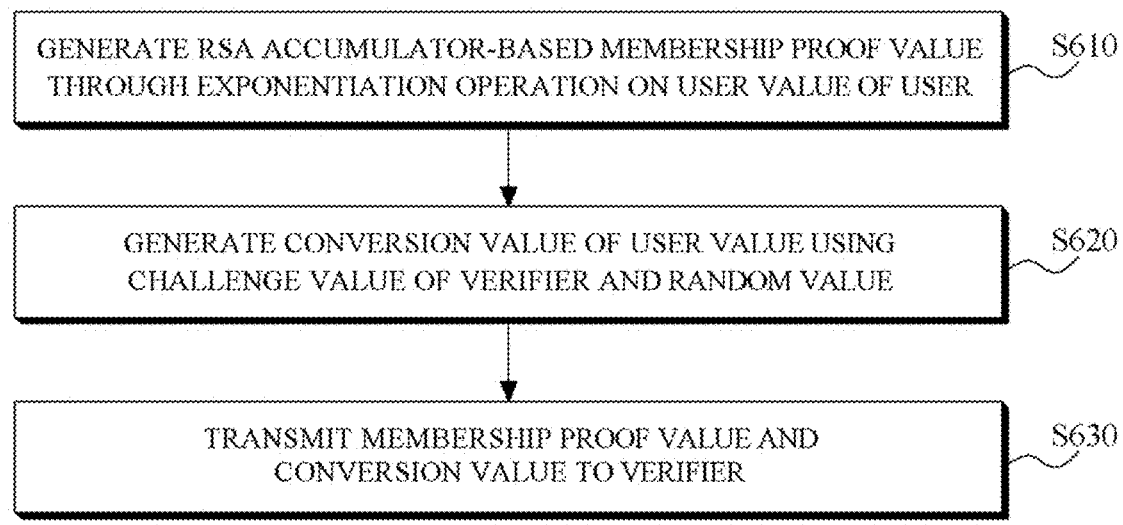
FIG. 6 is a flowchart illustrating a membership proof method for ensuring privacy according to still another exemplary embodiment of the present disclosure.

FIG. 6 is a flowchart illustrating a membership proof method for ensuring privacy according to still another exemplary embodiment of the present disclosure.

Referring to FIG. 6, a computing device according to an exemplary embodiment of the present disclosure generates an RSA accumulator-based membership proof value through an exponentiation operation on a user value of a user (S610) and generates a conversion value of the user value using a challenge value of a verifier and a random value (S620). Then, the computing device transmits the generated membership proof value and conversion value to the verifier (S630).

According to the embodiment, the computing device may generate commitment values for the user value and the random value and transmit the commitment values to the verifier, and the verifier may verify that the user value is a value used in common for the conversion value and the membership proof value using the conversion value and the commitment values.

Also, the computing device may update the membership proof value by additionally exponentiating the membership proof value generated in operation S610 by at least one prime number selected from a preset random prime number set. Likewise, the computing device may also update the conversion value using a prime number of the random prime number set other than the selected prime number. Then, the computing device may additionally generate and transmit a commitment value for the other prime number to the verifier together with the updated membership proof value and conversion value.

Figure 7:
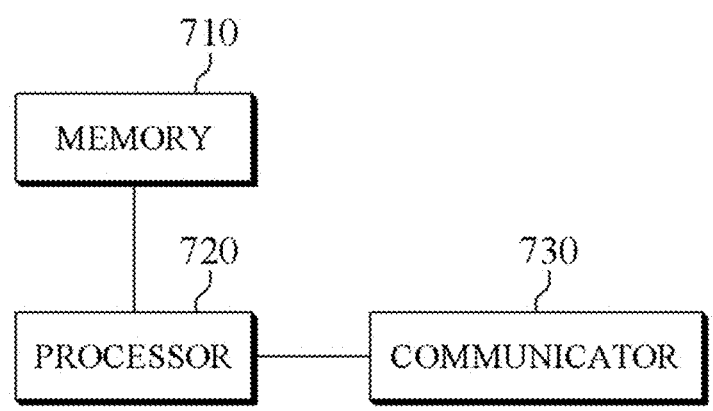
FIG. 7 is a block diagram illustrating a membership proof device for ensuring privacy according to an exemplary embodiment of the present disclosure.

FIG. 7 is a block diagram illustrating a membership proof device for ensuring privacy according to an exemplary embodiment of the present disclosure.

Referring to FIG. 7, the membership proof device according to the exemplary embodiment of the present disclosure includes a memory 710, at least one processor 720, and a communicator 730.

The processor 720 electrically connected to the memory 710 performs the foregoing process for membership proof. The processor 720 performs a first calculation for a user's membership proof using a zero-knowledge proof algorithm and performs a second calculation for the user's membership proof on a user value of the user using an RSA accumulator-based membership proof algorithm. The first calculation is a calculation for generating a conversion value, a commitment value, a zero-knowledge proof value, and the like, and the second calculation is a calculation for generating a membership proof value.

The communicator 730 transmits results of the first and second calculations to a verifier.

According to an exemplary embodiment of the present disclosure, an exponentiation operation for RSA accumulator-based membership proof is performed out of a zero-knowledge proof algorithm, and thus a time required for membership proof can be reduced.

Also, according to an exemplary embodiment of the present disclosure, an RSA accumulator-based membership proof value is exponentiated by a prime number, and thus a user's privacy can be effectively ensured.

The above-described technical details may be implemented in the form of program commands that can be executed by various computing devices and recorded on a computer-readable medium. The computer-readable medium may include program commands, data files, data structures, and the like solely or in combination. The program commands recorded on the medium may be specially designed and constructed for embodiments or may be known and available to those of ordinary skill in the art of computer software. Examples of the computer-readable medium include magnetic media, such as a hard disk, a floppy disk, and magnetic tape, optical media, such as a compact disc (CD)-read only memory (ROM) and a digital versatile disc (DVD), magneto-optical media, such as a floptical disk, and hardware devices specially configured to store and execute program commands such as a ROM, a random-access memory (RAM), a flash memory, and the like. Examples of the program commands include not only a machine language code generated by a compiler but also a high-level language code which is executable by a computer using an interpreter and the like. A hardware device may be configured to operate as one or more software modules to perform operations of embodiments, and vice versa.

Although the present disclosure has been described with reference to particular matters, such as detailed components, limited embodiments, and drawings, these are merely provided to help overall understanding of the present disclosure, and the present disclosure is not limited to the embodiments. Those of ordinary skill in the art can make various alterations and modifications from the embodiments. Therefore, the spirit of the present disclosure should not be limited to the described embodiments, and it should be construed that the following claims and all equivalents or equivalent modifications of the claims fall within the scope of the present disclosure.

What is claimed is:

1. A membership proof method for ensuring privacy, comprising:
    performing a first calculation for a user's membership proof using a zero-knowledge proof algorithm and performing a second calculation for the user's membership proof on a user value of the user using a Rivest-Shamir-Adleman (RSA) accumulator-based membership proof algorithm; and
    transmitting results of the first and second calculations to a verifier,
    wherein the first calculation includes addition or multiplication, and the second calculation includes a calculation for generating a membership proof value through an exponentiation operation on the user value,
    wherein the performing of the first calculation comprises generating a conversion value of the user value using a challenge value of the verifier and a random value,
    wherein the performing of the first calculation comprises generating commitment values for the user value and the random value, and
    wherein the verifier verifies that the user value is a value used in common for the conversion value and the membership proof value using the conversion value and the commitment values.

2. The membership proof method of claim 1, wherein the performing of the second calculation comprises exponentiating the membership proof value by at least one prime number selected from a preset random prime number set, and
    the performing of the first calculation comprises generating the conversion value using a prime number of the random prime number set other than the selected prime number.

3. The membership proof method of claim 2, wherein the performing of the first calculation comprises generating a commitment value for the other prime number.

4. A membership proof method for ensuring privacy, comprising:
    generating a Rivest-Shamir-Adleman (RSA) accumulator-based membership proof value through an exponentiation operation on a user value of a user;
    generating a conversion value of the user value using a challenge value of a verifier and a random value;
    transmitting the membership proof value and the conversion value to the verifier; and
    generating commitment values for the user value and the random value and transmitting the commitment values to the verifier,
    wherein the verifier verifies that the user value is a value used in common for the conversion value and the membership proof value using the conversion value and the commitment values.

5. The membership proof method of claim 4, wherein the generating of the membership proof value comprises exponentiating the membership proof value by at least one prime number selected from a preset random prime number set, and
    the generating of the conversion value comprises generating the conversion value using a prime number of the random prime number set other than the selected prime number.

6. The membership proof method of claim 5, wherein the generating of the commitment values comprises generating a commitment value for the other prime number.

7. A membership proof device for ensuring privacy, comprising:
    a memory;
    at least one processor electrically connected to the memory; and
    a communicator,
    wherein the processor performs a first calculation for a user's membership proof using a zero-knowledge proof algorithm and performs a second calculation for the user's membership proof on a user value of the user using a Rivest-Shamir-Adleman (RSA) accumulator-based membership proof algorithm, and
    the communicator transmits results of the first and second calculations to a verifier,
    wherein the first calculation includes addition or multiplication, and the second calculation includes a calculation for generating a membership proof value through an exponentiation operation on the user value,
    wherein the performing of the first calculation comprises generating a conversion value of the user value using a challenge value of the verifier and a random value,
    wherein the performing of the first calculation comprises generating commitment values for the user value and the random value, and
    wherein the verifier verifies that the user value is a value used in common for the conversion value and the membership proof value using the conversion value and the commitment values.

8. The membership proof device of claim 7, wherein the zero-knowledge proof algorithm is a zero-knowledge Succinct Non-interactive Arguments of Knowledge (zk-SNARK) algorithm.

* * * * *